United States Patent [19]

Ueno

[11] Patent Number: 5,059,651

[45] Date of Patent: Oct. 22, 1991

[54] FLAME RETARDANT AND SMOKE SUPPRESSED POLYMERIC COMPOSITION AND ELECTRIC WIRE HAVING SHEATH MADE FROM SUCH COMPOSITION

[75] Inventor: Keiji Ueno, Osaka, Japan

[73] Assignee: Sumitomo Electric Industries, Ltd., Osaka, Japan

[21] Appl. No.: 559,453

[22] Filed: Jul. 25, 1990

Related U.S. Application Data

[63] Continuation of Ser. No. 240,377, Aug. 23, 1988, abandoned, which is a continuation of Ser. No. 775,943, Sep. 12, 1985, abandoned, which is a continuation of Ser. No. 564,649, Dec. 22, 1983, abandoned.

[30] Foreign Application Priority Data

Dec. 23, 1982 [JP] Japan ................... 57-231308

[51] Int. Cl.$^5$ ................... C08K 3/27; C08K 3/26
[52] U.S. Cl. ................... 524/424; 524/427; 524/436; 524/437; 428/372; 428/379; 428/389; 428/405; 174/110 V; 174/121 A
[58] Field of Search ............ 174/110 V, 721 A; 428/372, 379, 389, 405; 524/424, 427, 436, 437

[56] References Cited

U.S. PATENT DOCUMENTS

| | | | |
|---|---|---|---|
| 4,191,675 | 3/1980 | Inagaki et al. | 524/405 |
| 4,349,605 | 9/1982 | Biggs et al. | 524/106 |
| 4,426,549 | 1/1984 | Natwig | 524/405 |

FOREIGN PATENT DOCUMENTS 12093 2/1978 Japan .

OTHER PUBLICATIONS

The Condensed Chemical Dictionary, Ninth Edition, pp. 772–773.

*Primary Examiner*—Kriellion S. Morgan
*Attorney, Agent, or Firm*—Sughrue, Mion, Zinn, Macpeak & Seas

[57] ABSTRACT

A flame retardant and smoke suppressed polymeric composition comprising a radiation curable copolymer of ethylene and vinyl acetate containing 50–85% by weight of vinyl acetate having intimately admixed therewith a flame retarding and smoke suppressing amount of a finely divided filler mixture consisting essentially of a first filler selected from hydroxides and carbonate of di- and tri-valent metals and a second filler which is zinc borate, the composition may be shaped into a desired article, such as a sheath of an electric wire, which may be radiation cured.

40 Claims, No Drawings

FLAME RETARDANT AND SMOKE SUPPRESSED POLYMERIC COMPOSITION AND ELECTRIC WIRE HAVING SHEATH MADE FROM SUCH COMPOSITION

This is a continuation of application Ser. No. 07/240,377 filed Aug. 23, 1988, now abandoned which is a continuation of Ser. No. 06/775,943 filed Sept. 12, 1985, now abandoned, which is a continuation of application Ser. No. 06/564,649 filed Dec. 22, 1983, now abandoned.

BACKGROUND OF THE INVENTION

The present invention relates to a flame retardant and smoke suppressed polymeric composition which is flame retardant and, even upon flaming, smoke suppressed and productive of no aggressive gases. The invention also relates to an electric wire having a sheath made from such a composition.

Recently, requirements for the flame retardancy of wirings for buildings and wirings in electrical instruments are getting more and more severe. Insulating materials for such writings are required to be not only flame retardant but also, even upon flaming, smoke suppressed and productive of no harmful gases that would exert adverse effects upon human body and the instruments. Resins containing halogen atoms in the molecular structure, such as polyvinyl chloride resins, cannot be used for this purpose since they evolve aggressive, harmful gases upon flaming. Halogen-free resins such as polyolefins which have generally incorporated therein a flame retarding amount of a halogen compound as a flame retardant additive are also productive of a halogen gases upon flaming. Thus, attempts to impart the flame retardancy to a halogen free resin by adding thereto a halogen free flame retardant have been proposed. Among others, hydroxides and carbonates of certain metals, such as aluminum hydroxide, magnesium hydroxide and magnesium carbonate, as well as zinc borate are well known in the art as a suitable halogen free flame retardant (see K. C. Hecker et al., Paper No. 17, ACS Division of Rubber Chem. April, 1972; I. Sobelev et al., SPE 31st. Ann. Tech. Conf. Montreal, 1973, Preprints, p. 709; and D. F. Lawson et al., Paper No. 13 ASC Division of Rubber Chem. October, 1974).

The flame retardancy of a polymeric material may be estimated by the oxygen index which may be determined, for example, by the procedure prescribed in JIS-K-7201. In order that a polymeric material can be rated as being flame retardant upon vertical burning tests it should have an oxygen index as high as 27 to 30 or higher. The amount of smoke upon flaming of a polymeric material may be estimated in terms of the maximum smoke density upon flaming of the material, which may be determined using suitable equipment known as an NBS smoke density chamber. It is generally desired to reduce the maximum smoke density of the material to a level of 100 or below.

It has been frequently experienced that when a halogen free flame retardant filler such as magnesium carbonate, magnesium hydroxide, aluminum hydroxide or zinc borate is added to a halogen free polymeric material such as a polyolefin to provide a halogen free polymeric composition which is satisfactorily flame retardant (e.g., having an oxygen index of 30 or higher) and simultaneously satisfactorily smoke suppressed (e.g., having a maximum smoke density, upon flaming, of 100 or below), the addition of an undesirably large amount of the filler, which adversely affects mechanical properties and processability of the resultant polymeric composition, is normally required.

SUMMARY OF THE INVENTION

It is an object of the invention to provide a halogen free polymeric composition which is satisfactorily flame retardant and, even upon flaming, smoke suppressed and productive of no aggressive gases, with a reduced amount of a halogen free flame retardant filler.

Another object of the invention is to provide an electric wire having a sheath of acceptable mechanical properties which is flame retardant and, even upon flaming, smoke suppressed and productive of no aggressive gases.

In one aspect of the invention, the invention provides a flame retardant and smoke suppressed polymeric composition, which comprises:

a radiation curable copolymer of ethylene and vinyl acetate containing 50 to 85% by weight of polymerized units derived from vinyl acetate; and a flame retarding and smoke suppressing amount of a finely divided filler mixture intimately admixed with said copolymer, said filler mixture consisting essentially of a first filler selected from the group consisting of hydroxides and carbonates of di- and tri-valent metals and a second filler which is zinc borate, the ratio by weight of said second filler to the filler mixture being within the range between 0.25 to 0.75.

In another aspect of the invention there is provided an electric wire comprising a core conductor and a flame retardant and smoke suppressed insulating sheath, said sheath comprises:

a radiation cured copolymer of ethylene and vinyl acetate containing 50 to 85% by weight of polymerized units derived from vinyl acetate; and a flame retarding and smoke suppressing amount of a finely divided filler mixture intimately admixed with said copolymer, said filler mixture consisting essentially of a first filler selected from the group consisting of a hydroxides and carbonates of di- and tri-valent metals and a second filler which is zinc borate, the ratio by weight of said second filler to the filler mixture being within the range between 0.25 and 0.75.

DETAILED DESCRIPTION OF THE INVENTION

Examples of the first filler include, for example, aluminum hydroxide, magnesium hydroxide, calcium hydroxide, barium hydroxide, magnesium carbonate, magnesium calcium carbonate, calcium carbonate, zinc carbonate and barium carbonate.

By the term "a base polymeric material" used herein is meant a polymeric material, of which the flame retardant and smoke suppressed polymeric composition is prepared by intimately admixing therewith the specified filler mixture. Preferably, the base polymeric material essentially consists of a radiation curable copolymer of ethylene and vinyl acetate containing 50 to 85% by weight of polymerized units derived from vinyl acetate. However, depending upon the desired properties of the final products the base polymeric material may be a blend of such a copolymer and up to about 50% by weight, based on the blend, of one or more other polymers. Examples of such other polymers include, e.g., polyethylene, polypropylene, a copolymer of ethylene and vinyl acetate containing less than 50% by weight of vinyl acetate, a copolymer of ethylene and ethyl acrylate, a copolymer of ethylene and α-olefin, EP rubber, butyl rubber, polybutadiene and polyurethane.

By the term "a flame retarding and smoke suppressing amount of a filler mixture" used herein is meant an amount of the filler mixture required to achieve a desired level of flame retardancy and at the same time a desired level of suppressed smoking. More particularly, it means an amount of the mixture admixed with a base polymeric material to provide a polymeric composition having concurrently a desired level of flame retardancy and a desired level of suppressed smoking. Generally at least 100 parts by weight of the filler mixture based on 100 parts by weight of the base polymeric material is required to obtain satisfactory results. A desirable polymeric composition both before and after radiation curing has an oxygen index of 30 or higher and a maximum smoke density of 100 or below. The upper limit of the filler mixture admixed with the base polymeric material is not strictly critical. But it should be noted that addition of an excessive amount of the filler mixture adversely affect mechanical properties and processability of the composition, and therefore addition of the filler mixture in excess of about 300 parts by weight base on 100 parts by weight of the base polymeric material should be normally avoided. In this connection, a base polymeric material consisting essentially of a copolymer of ethylene and vinyl acetate containing 50–85% by weight of polymerized units derived from vinyl acetate is advantageous in that it can be heavily loaded with the filler mixture, if desired, without its mechanical properties after curing and processability intolerably deteriorated.

Mechanical properties of the base polymeric material which have been reduced by the addition of the filler mixture can be improved by subjecting the composition to radiation curing normally after shaping. For example, a copolymer of ethylene and vinyl acetate containing about 60% by weight of vinyl acetate and having a molecular weight of about 200,000, as admixed with the same weight of a finely divided inorganic filler (aluminum hydroxide), has a tensile strength as low as 0.1 kg/mm$^2$, and is of no practical use. However, when such a composition is irradiated with 20 M rad of electron beams, the tensile strength reaches 0.6 kg/mm$^2$, the level normally possessed by vulcanized rubbers, rendering the product practically useful.

It should also be pointed out that radiation curing ensures effective shaping and crosslinking of the material. This is not the case with chemical curing by means of an organic peroxide. Because of a high torque in the filled material being shaped, a temperature of the material being shaped necessarily reaches about 200° C., which exceeds the decomposition temperature (normally 120° to 180° C.) or organic peroxides. Accordingly, when the material contains an organic peroxide, crosslinking takes place within the shaping machine, so that the material may not be suitably shaped.

The filler mixture consists essentially of a first filler selected from the group consisting of hydroxides and carbonates of di- and tri-valent metals and a second filler which is zinc borate. For the purpose of the invention, the ratio by weight of the second filler to the filler mixture must be within the range between 0.25 to 0.75. If this ratio is substantially higher than 0.75, an intolerably large amount of the filler mixture is required to achieve a desirably high oxygen index. Likewise, if this ratio is substantially lower than 0.25, an unacceptably large amount of the filler mixture is required to achieve a desirably low maximum smoke density.

Optionally, the polymeric composition may contain other additives, including, for example, antioxidants, lubricants, slipping agents, pigments and halogen containing flame retardants, in an amount of up to about 10 parts by weight based on 100 parts by weight of the base polymeric material.

While the flame retardant and smoke suppressed polymeric composition disclosed herein is particularly useful for forming a sheath or coating of a wire or cable. It is also useful for the production of other shaped articles. The composition is shaped into a desired article, which may be radiation cured.

EXAMPLE 1

A finely divided filler mixture consisting essentially of 100 parts by weight of aluminum hydroxide and 100 parts by weight of zinc borate was prepared. A copolymer of ethylene and vinyl acetate having a molecular weight of about 200,000 and containing about 60% by weight of vinyl acetate was intimately admixed with the filler mixture in varied amounts indicated in Table 1 to provide various polymeric composition.

A copper wire having a diameter of 0.8 mm was coated with each polymeric composition to provide a coated wire having an outer diameter of 2.4 mm, which was then irradiated with 20 M rad of electron beams. A sheath of each electric wire so prepared was tested for its maximum density upon flaming, oxygen index and tensile strength. Results are shown in Table 1.

TABLE 1

| | Polymeric Composition | | Maximum | | Tensile |
|---|---|---|---|---|---|
| | Copolymer (parts by weight) | Filler Mixture (Parts by weight) | Smoke Density | Oxygen Index | Strength (kg/mm$^2$) |
| 1 | 100 | 100 | 90 | 30 | 0.61 |
| 2 | 100 | 150 | 75 | 32 | 0.66 |
| 3 | 100 | 200 | 75 | 35 | 0.65 |
| 4 | 100 | 250 | 60 | 55 | 0.79 |

It is revealed from Table 1 that when the filler mixture (1:1 aluminum hydroxide and zinc borate) is used, a preferred composition and sheath having a maximum smoke density of 100 or below and an oxygen index of 30 or higher can be obtained with less than 250 parts by weight of the filler per 100 parts by weight of the copolymer.

A similar series of experiments, in which aluminum hydroxide alone was used instead of the filler mixture, showed that at least 250 parts by weight of the aluminum hydroxide per 100 parts by weight of the copolymer was required to simultaneously achieve a maximum smoke density of 100 or below and an oxygen index of 30 or higher. Another series of the experiments wherein zinc borate was used as a sole flame retardant revealed that a maximum smoke density of 100 or below and an oxygen index of 30 or higher could be simultaneously achieved only when the zinc borate was used in an amount of about 300 parts by weight or more based on 100 parts by weight of the copolymer.

EXAMPLE 2

The preparation and test procedures of Example 1 were repeated except that a 1:1 (by weight) mixture of magnesium carbonate and zinc borate was used instead of the filler mixture of Example 1. Results are shown in Table 2.

TABLE 2

| | Polymeric Composition | | Maximum | | Tensile |
|---|---|---|---|---|---|
| | Copolymer (parts by weight) | Filler Mixture (Parts by weight) | Smoke Density | Oxygen Index | Strength (kg/mm$^2$) |
| 1 | 100 | 100 | 88 | 31 | 0.59 |
| 2 | 100 | 150 | 73 | 34 | 0.63 |
| 3 | 100 | 200 | 55 | 36 | 0.63 |
| 4 | 100 | 250 | 50 | 60 | 0.66 |

Table 2 reveals that when the filler mixture (1:1 magnesium carbonate and zinc borate) is used, a preferred composition and sheath having a maximum density of 100 or below and an oxygen index of 30 or higher can be obtained with less than 250 parts by weight of the filler mixture per 100 parts by weight of the copolymer.

While the invention has been described in detail and with reference to specific embodiment thereof, it will be apparent to one skilled in the art that various changes and modifications can be made therein without departing from the spirit and scope thereof.

What is claimed is:

1. A flame retardant and smoke suppressed polymeric thermoplastic composition, which consists of:
   a radiation curable copolymer of ethylene and vinyl acetate containing 50 to 85% by weight of polymerized units derived from vinyl acetate; and
   a flame retarding and smoke suppressing amount of finely divided filler mixture intimately admixed with said copolymer, said filler mixture consisting essentially of a first filler selected from the group consisting of hydroxides and carbonates of di- and tri-valent metals and a second filler which is zinc borate, the ratio by weight of said second filler to the filler mixture being within the range between 0.25 and 0.75.

2. The composition according to claim 1, wherein said first filler is aluminum hydroxide.

3. The composition according to claim 1, wherein said first filler is magnesium hydroxide.

4. The composition according to claim 1, wherein said first filler is calcium hydroxide.

5. The composition according to claim 1, wherein said first filler is barium hydroxide.

6. The composition according to claim 1, wherein said first filler is magnesium carbonate.

7. The composition according to claim 1, wherein said first filler is magnesium calcium carbonate.

8. The composition according to claim 1, wherein said first filler is calcium carbonate.

9. The composition according to claim 1, wherein said first filler is zinc carbonate.

10. The composition according to claim 1, wherein said first filler is barium carbonate.

11. In an electric wire comprising a core conductor and a flame retardant and smoke suppressed insulating sheath, the improvement wherein said sheath comprises a smoke suppressed polymeric thermoplastic composition which consists of:
   a radiation cured copolymer of ethylene and vinyl acetate containing 50 to 85% by weight of polymerized units derived from vinyl acetate; and
   a flame retarding and smoke suppressing amount of finely divided filler mixture intimately admixed with said copolymer, said filler mixture consisting essentially of a first filler selected from the group consisting of hydroxides and carbonates of di- and tri-valent metals and a second filler which is zinc borate, the ratio by weight of said second filler to the filler mixture being within the range between 0.25 and 0.75.

12. The electric wire according to claim 11, wherein said first filler is aluminum hydroxide.

13. The electric wire according to claim 11, wherein said first filler is magnesium hydroxide.

14. The electric wire according to claim 11, wherein said first filler is calcium hydroxide.

15. The electric wire according to claim 11, wherein said first filler is barium hydroxide.

16. The electric wire according to claim 11, wherein said first filler is magnesium carbonate.

17. The electric wire according to claim 11, wherein said first filler is magnesium calcium carbonate.

18. The electric wire according to claim 11, wherein said first filler is calcium carbonate.

19. The electric wire according to claim 11, wherein said first filler is zinc carbonate.

20. The electric wire according to claim 11, wherein said first filler is barium carbonate.

21. A flame retardant and smoke suppressed polymeric thermoplastic composition, which consists of:
   a radiation curable copolymer of ethylene and vinyl acetate containing 50 to 85% by weight of polymerized units derived from vinyl acetate; and
   a flame retarding and smoke suppressing amount of finely divided filler mixture intimately admixed with said copolymer, said filler mixture consisting of a first filler selected from the group consisting of hydroxides and carbonates of di- and tri-valent metals and a second filler which is zinc borate, the ratio by weight of said second filler to the filler mixture being within the range between 0.25 and 0.75.

22. The composition according to claim 21, wherein said first filler is aluminum hydroxide.

23. The composition according to claim 21, wherein said first filler is magnesium hydroxide.

24. The composition according to claim 21, wherein said first filler is calcium hydroxide.

25. The composition according to claim 21, wherein said first filler is barium hydroxide.

26. The composition according to claim 21, wherein said first filler is magnesium carbonate.

27. The composition according to claim 21, wherein said first filler is magnesium calcium carbonate.

28. The composition according to claim 21, wherein said first filler is calcium carbonate.

29. The composition according to claim 21, wherein said first filler is zinc carbonate.

30. The composition according to claim 21, wherein said first filler is barium carbonate.

31. In an electric wire comprising a core wire conductor and a flame retardant and smoke suppressed insulating sheath, the improvement wherein said sheath comprises a smoke suppressed polymeric thermoplastic composition which consists of:
- a radiation cured copolymer of ethylene and vinyl acetate containing 50 to 85% by weight of polymerized units derived from vinyl acetate; and
- a flame retarding and smoke suppressing amount of finely divided filler mixture intimately admixed with said copolymer, said filler mixture consisting of a first filler selected from the group consisting of hydroxides and carbonates of di- and tri-valent metals and a second filler which is zinc borate, the ratio by weight of said second filler to the filler mixture being within the range between 0.25 and 0.75.

32. The electric wire according to claim 31, wherein said first filler is aluminum hydroxide.

33. The electric wire according to claim 31, wherein said first filler is magnesium hydroxide.

34. The electric wire according to claim 31, wherein said first filler is calcium hydroxide.

35. The electric wire according to claim 31, wherein said first filler is barium hydroxide.

36. The electric wire according to claim 31, wherein said first filler is magnesium carbonate.

37. The electric wire according to claim 31, wherein said first filler is magnesium calcium carbonate.

38. The electric wire according to claim 31, wherein said first filler is calcium carbonate.

39. The electric wire according to claim 31, wherein said first filler is zinc carbonate.

40. The electric wire according to claim 31, wherein said first filler is barium carbonate.

* * * * *